March 10, 1942.  H. B. LINDSAY  2,276,052
FORMING-DIE APPARATUS
Filed March 6, 1939  7 Sheets—Sheet 1
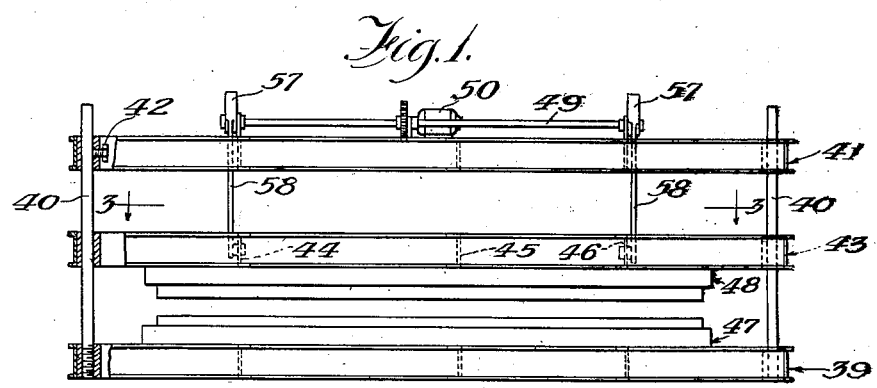
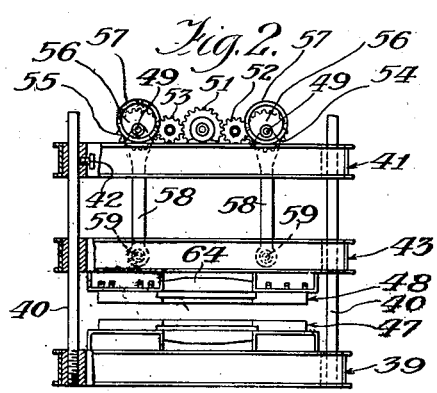
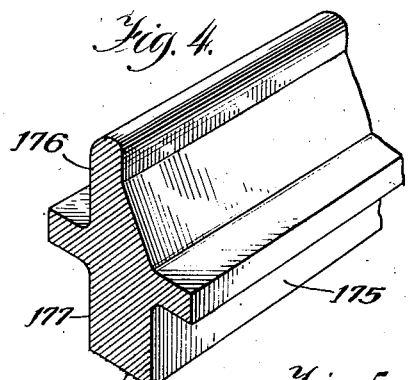
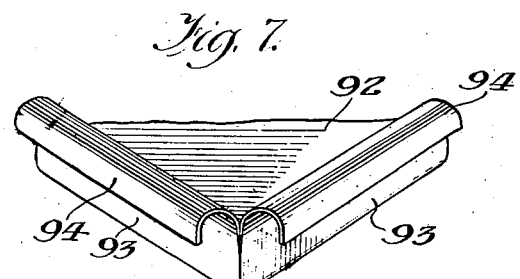
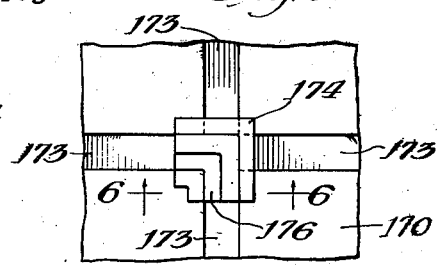
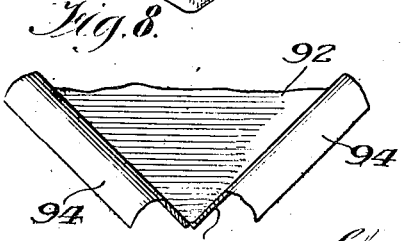
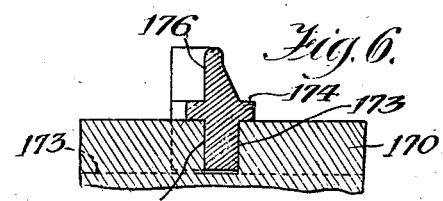
Inventor:
Harvey B. Lindsay
By Chritton, Wiles, Davies, Hirschl and Dawson
Attorneys

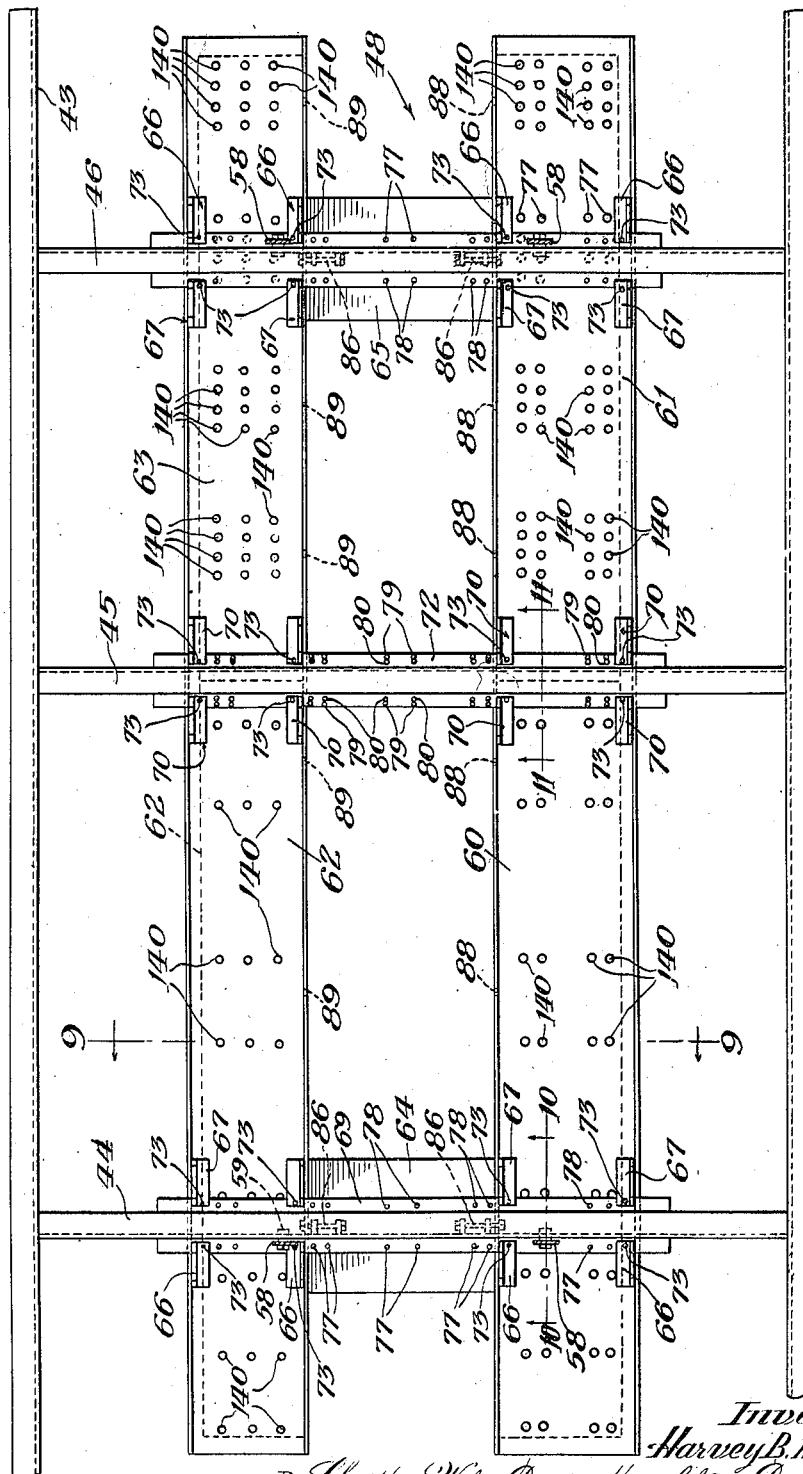

March 10, 1942.	H. B. LINDSAY	2,276,052
FORMING-DIE APPARATUS
Filed March 6, 1939	7 Sheets-Sheet 3
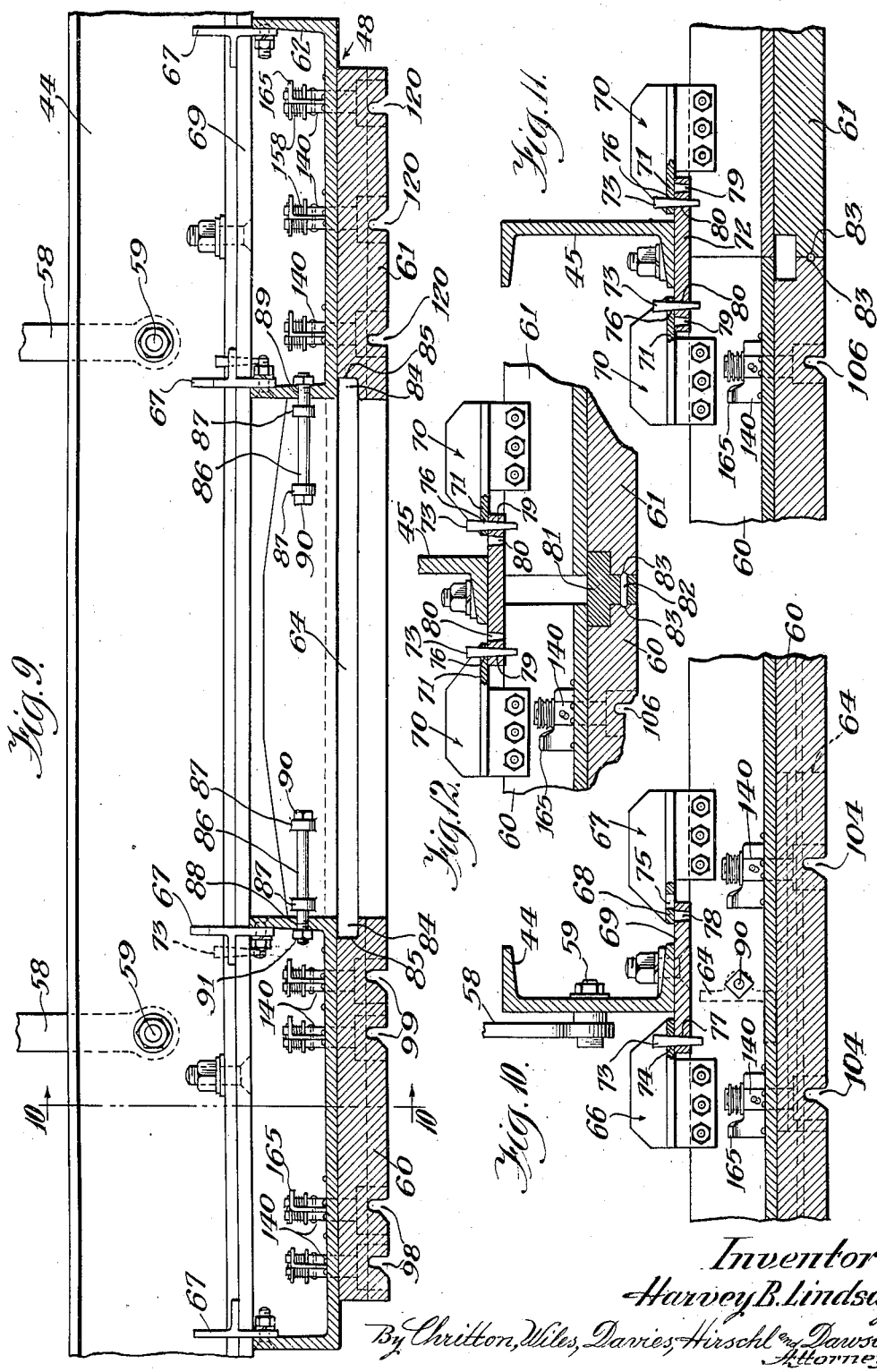

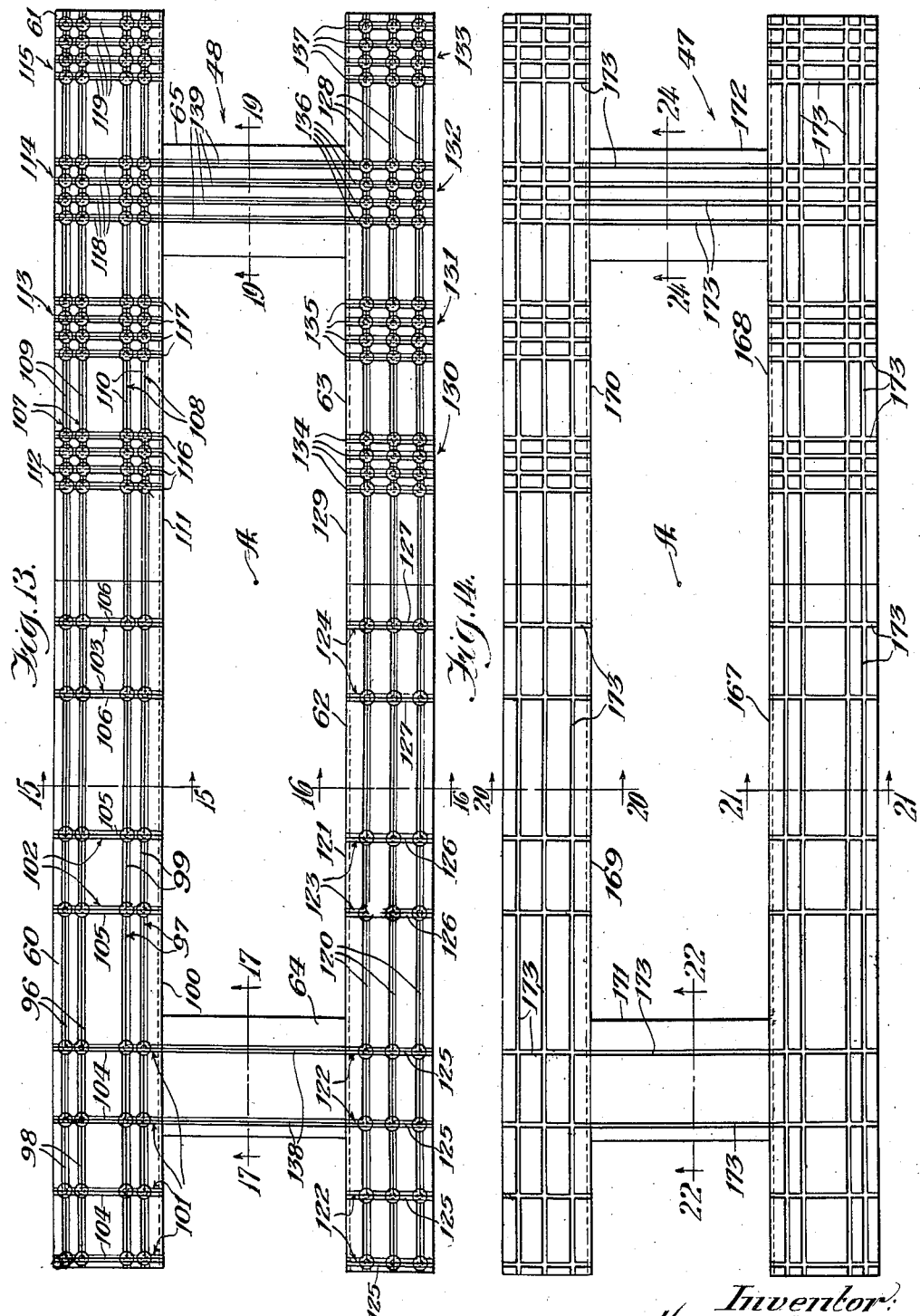

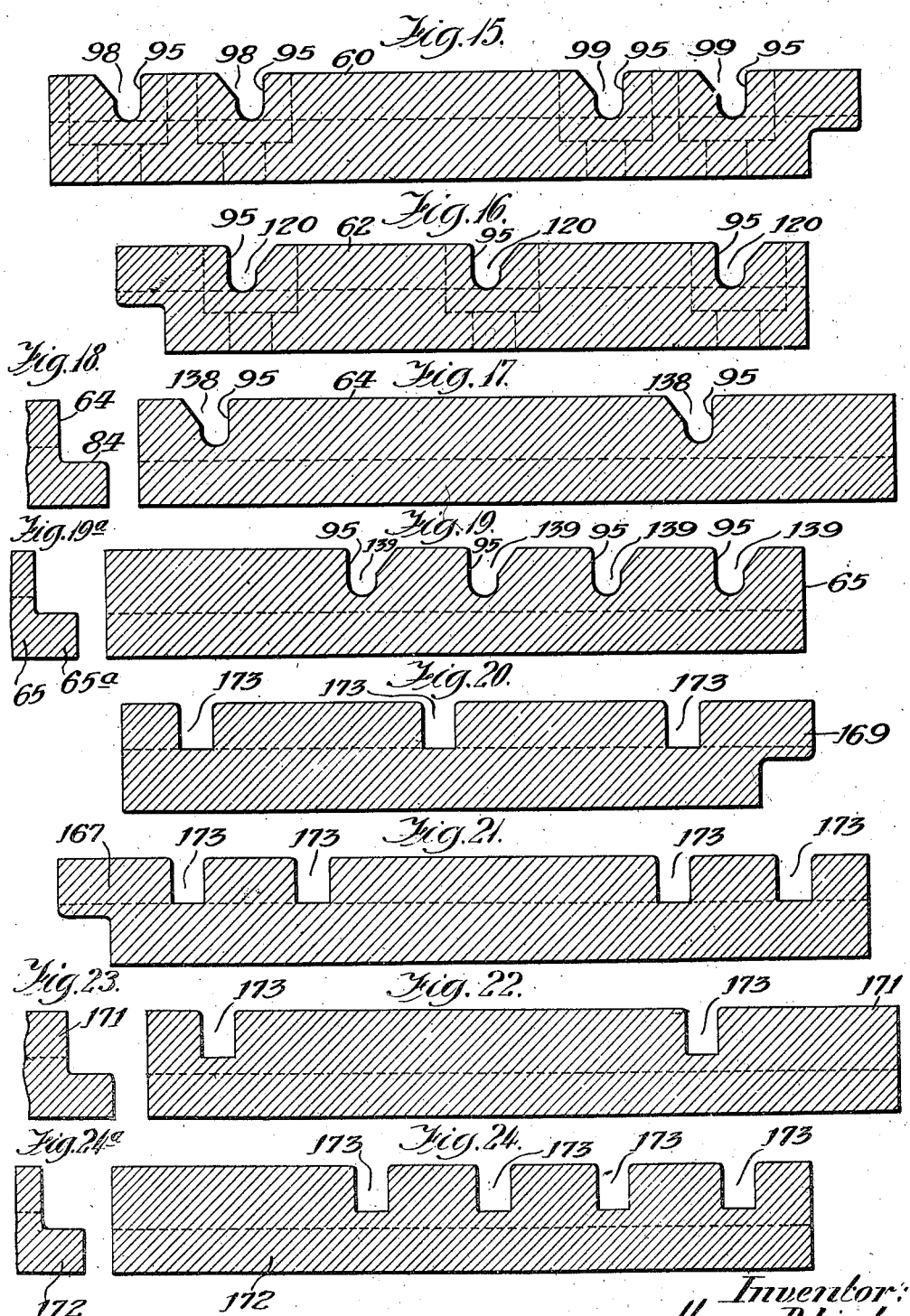

March 10, 1942.   H. B. LINDSAY   2,276,052
FORMING-DIE APPARATUS
Filed March 6, 1939   7 Sheets-Sheet 6
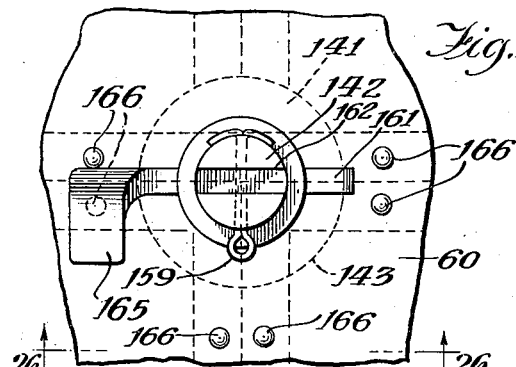
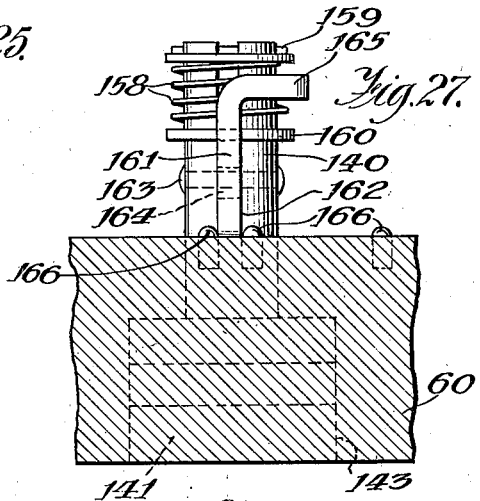
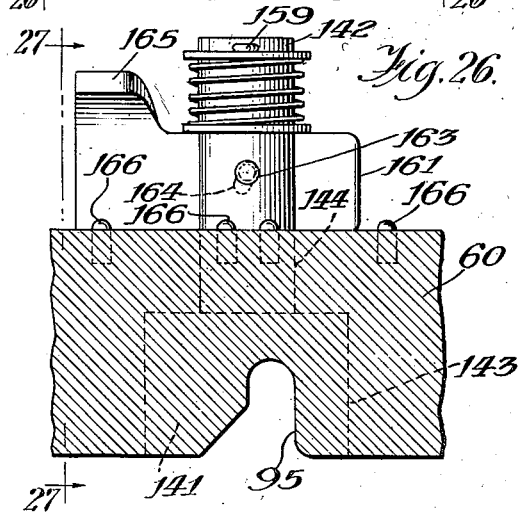
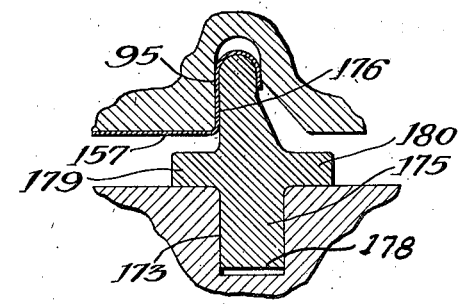
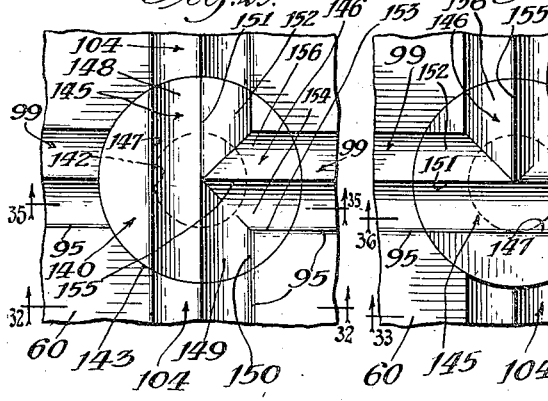
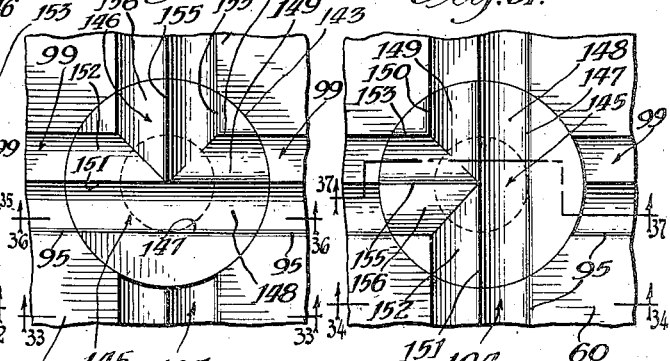
Inventor:
Harvey B. Lindsay
By Chritton, Wiles, Davies, Hirschl and Dawson
Attorneys.

March 10, 1942.  H. B. LINDSAY  2,276,052
FORMING-DIE APPARATUS
Filed March 6, 1939  7 Sheets-Sheet 7

Inventor:
Harvey B. Lindsay
By Chritton, Wiles, Davies, Hirschl and Dawson
Attorneys.

Patented Mar. 10, 1942

2,276,052

UNITED STATES PATENT OFFICE 2,276,052

FORMING-DIE APPARATUS

Harvey B. Lindsay, Evanston, Ill.

Application March 6, 1939, Serial No. 260,187

14 Claims. (Cl. 153—2)

My invention relates more particularly to die apparatus for flanging edges of sheets especially of metal as for example in the production of flanged-edges panels.

Certain of my objects are as follows:

To provide improvements in die apparatus of the character stated whereby the number of adjustments, or manipulations, of the parts of the apparatus for producing products of different sizes and shapes shall be greatly reduced compared with apparatuses as hitherto provided;

To provide female die structure which shall have the capacity for the production, in combination with a male die assembly, of different sizes and shapes of products, preferably throughout a relatively wide range of sizes and shapes without requiring any adjustment of the female die structure;

To provide a male die assembly of such construction that it may be quickly and easily conditioned for the production, in cooperation with a female die assembly, of different sizes and shapes of products;

To provide a male die assembly involving a base member and die-bars applied thereto, of such construction that the die bars may be assembled on the base member in the desired operative positions, especially for the production of products of different sizes and shapes, by the mere application of the die bars to the base member without requiring the connecting together of the bars or the use of die-bar fastening means.

To provide a female die assembly which shall have the capacity, by the minimum of adjustments, for producing a still greater number of sizes and shapes of products than possible without adjustment;

To provide a combination of male and female dies of the nature describes, having capacity to flange, on all four sides at once, a variety of sizes and shapes of sheets, which may aggregate thousands of sizes and shapes, with no additions to the female die and so small and quick changes in both male and female dies as to establish a new speed development in the art.

To provide for the ensuring of the production of flanged edged sheets the edges of which shall be free of imperfections regardless of the size or shape of the sheets; and Generally to provide improvements in apparatus of the general character above referred to to the end of rendering the apparatus better adapted for its intended purpose.

Referring to the accompanying drawings:

Figure 1 is a view in front elevation of a forming-die apparatus embodying my invention.

Figure 2 is an end view of the apparatus of Fig. 1.

Figure 3 is an enlarged plan sectional view of the apparatus of Fig. 1, the section being taken at the line 3—3 on Fig. 1 and viewed in the direction of the arrows.

Figure 4 is a fragmentary perspective view of one of the male die elements forming a part of the apparatus.

Figure 5 is a fragmentary plan view of the base member of the male die assembly showing in position thereon one of the similar corner male die elements forming a part of the apparatus.

Figure 6 is a fragmentary sectional view taken at the line 6—6 on Fig. 5 and viewed in the direction of the arrows.

Figure 7 is a fragmentary perspective view of a flanged sheet metal panel produced by the apparatus.

Figure 8 is a plan view of the structure shown in Fig. 7 with a portion of its illustrated corner broken away.

Figure 9 is an enlarged sectional view taken at the line 9—9 on Fig. 3 and viewed in the direction of the arrows.

Figure 10 is a section taken at the lines 10—10 on Figs. 3 and 9 and viewed in the direction of the respective arrows.

Figure 11 is a section taken at the line 11—11 on Fig. 3 and viewed in the direction of the arrows.

Figure 12 is a view like Fig. 11 and of the parts therein shown, illustrating certain of the parts of the female die assembly adjusted into a position different from that shown in Fig. 11, with a filler interposed.

Figure 13 is a bottom view, somewhat diagrammatic, of the sections forming the female die assembly.

Figure 14 is a plan view, somewhat diagrammatic, of the parts comprising the base portion of the male die assembly.

Figure 15 is an enlarged sectional view taken at the line 15—15 on Fig. 13 and viewed in the direction of the arrows.

Figure 16 is an enlarged sectional view taken at the line 16—16 on Fig. 13 and viewed in the direction of the arrows.

Figure 17 is an enlarged sectional view taken at the line 17—17 on Fig. 13 and viewed in the direction of the arrows.

Figure 18 is a fragmentary sectional view of one of the similar ends of the structure shown in Fig. 17, this section being taken normal to the section line 17—17 of Fig. 13.

Figure 19 is an enlarged sectional view taken at the line 19—19 on Fig. 13 and viewed in the direction of the arrows.

Figure 19a is a fragmentary sectional view of one of the similar ends of the structure shown in Fig. 19, this section being taken normal to the section line 19—19 of Fig. 13.

Figure 20 is an enlarged sectional view taken at the line 20—20 on Fig. 14 and viewed in the direction of the arrows.

Figure 21 is an enlarged sectional view taken at the line 21—21 on Fig. 14 and viewed in the direction of the arrows.

Figure 22 is an enlarged section taken at the line 22—22 on Fig. 14 and viewed in the direction of the arrows.

Figure 23 is a fragmentary sectional view of one of the similar ends of the structure shown in Fig. 22, this section being taken normal to the section line 22—22 of Fig. 14.

Figure 24 is a section taken at the line 24—24 on Fig. 14 and viewed in the direction of the arrows.

Figure 24a is a fragmentary sectional view of one of the similar ends of the structure shown in Fig. 24, this section being taken normal to the section line 24—24 of Fig. 14.

Figure 25 is a plan view of a portion of the female die assembly equipped with one of the similar rotatable die-groove devices located at intersecting grooves of the assembly.

Figure 26 is a fragmentary sectional view taken at the line 26—26 on Fig. 25 and viewed in the direction of the arrows.

Figure 27 is a fragmentary sectional view taken at the line 27—27 on Fig. 26 and viewed in the direction of the arrows.

Figure 28 is a fragmentary sectional view taken through the male and female die assemblies illustrating the operation of the flanging of an edge of the sheet.

Figures 29, 30 and 31, are fragmentary bottom views of a portion of the female die assembly equipped with one of the rotatable die-groove devices referred to at intersecting grooves of the assembly and illustrating the various positions to which the rotatable device may be adjusted about its axis, in the use of the apparatus.

Figure 32:
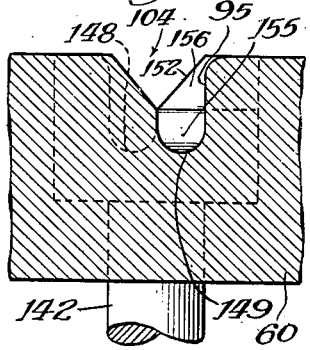
Figure 32 is a section taken at the line 32—32 on Fig. 29 and viewed in the direction of the arrows.
Figure 33:
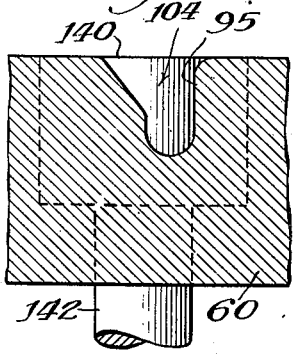
Figure 33 is a section taken at the line 33—33 on Fig. 30 and viewed in the direction of the arrows.
Figure 34:
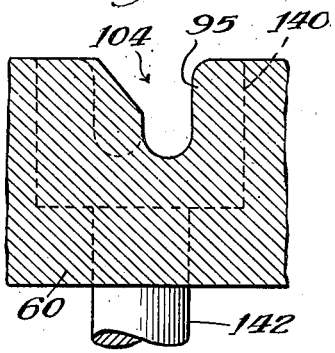
Figure 34 is a section taken at the line 34—34 on Fig. 31 and viewed in the direction of the arrows.
Figure 35:
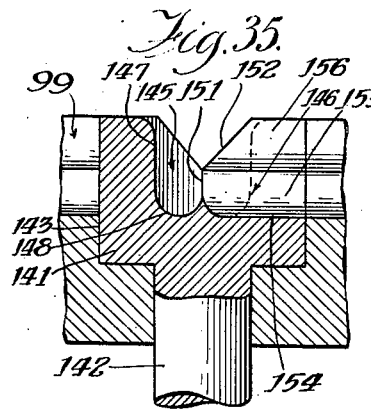
Figure 35 is a section taken at the line 35—35 on Fig. 29 and viewed in the direction of the arrows.
Figure 36:
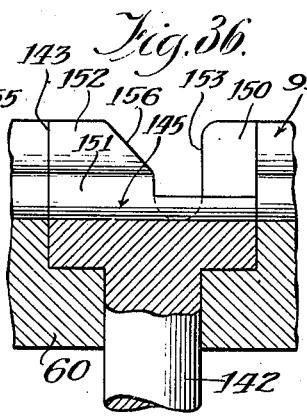
Figure 36 is a section taken at the line 36—36 on Fig. 30 and viewed in the direction of the arrows.
Figure 37:
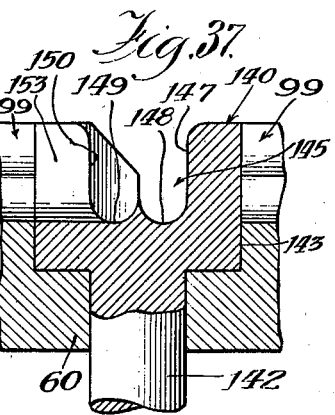
Figure 37 is a section taken at the irregular line 37—37 on Fig. 31 and viewed in the direction of the arrows.
Figure 38:
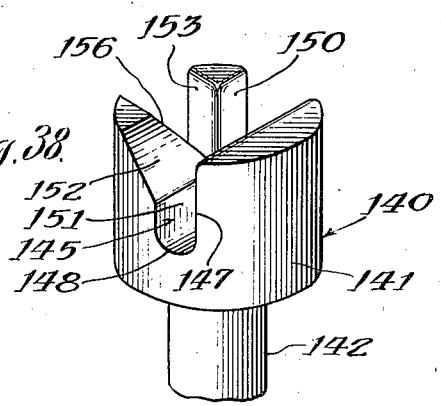
Figure 38, a perspective view of one of the similar rotatable die-groove devices showing it in inverted position.

The apparatus shown comprises a frame structure formed of a lower rectangular frame 39 provided at its corners with posts 40; an upper rectangular frame 41 slidable vertically on the posts 40 and having means, such as set screws, one being shown at 42, for holding it at the desired elevation; and an intermediate rectangular frame 43 slidable vertically on the posts 40; each frame being shown as provided with three cross girders, these girders of frame 43 being indicated at 44, 45 and 46.

In this particular embodiment of my invention the lowermost frame 39 supports the male die assembly, represented generally at 47, and the female die assembly, represented generally at 48, is carried by the intermediate frame 43, the female die assembly 48 being forced toward the male die assembly in the forming operation.

The means shown for thus operating the female die assembly 48 comprises a pair of shafts 49 journaled on the frame 41 and rotated by a motor 50 on the frame 41 geared, as by gears 51, 52, 53, 54 and 55, to the shafts 49; an eccentric on each end of each shaft 49, the eccentrics at one end of the apparatus being shown at 56; and eccentric straps 57 surrounding the eccentrics and having bar-extensions 58 pivoted at their lower ends, as indicated at 59, to the girders 44 and 46.

The female die assembly is formed of two pairs of plates 60, 61, 62 and 63 shown as of channel shape with their flanges upwardly extending, and plates 64 and 65 disposed transversely of, and between, the plates 60-63, inclusive. The plates 60 and 61 are lineally alined and the plates 62 and 63 similarly alined; the plates 60 and 61 being disposed parallel with the plates 62 and 63.

The plates 60-63, inclusive, are mounted on the frame 43 for adjustment longitudinally and transversely thereof and the cross plates 64 and 65 are adapted for removal and adjustment lengthwise of the plates 60-63, inclusive.

The manner of supporting each of the plates 60-63, inclusive, for movement as stated and the means for securing them in adjusted position are the same for all of these plates and therefore the detailed illustration and following description of the means for supporting one of these plates and for securing it in the desired position of adjustment will suffice.

The detailed showing is directed to the plate 60, this plate being provided at its flanges adjacent one end, with two pairs of clips 66 and 67 having extensions 68 which overlie the opposite edges of a plate 69 extending along, and secured to, the underside of the girder 44, the body portions of the opposed pairs of clips 66 and 67 being spaced apart a greater distance than the width of the plate 69.

The other end of the plate 60 carries on its flanges a pair of clips 70 having extensions 71 which overlie an edge of a plate 72, like the plate 69, secured to the underside of the girder 45, the body portions of these clips being spaced from the plate 72.

It will thus be understood that the plate 60 may be slid along the girders 44 and 45 lengthwise of the latter and also slid a limited distance crosswise of these girders.

The means shown for securing the plate 60 in adjusted position on the girders 44 and 45 comprises taper pins 73 insertible into openings in the clips 66, 67 and 70 and openings in the edges of the plates 69 and 72.

The openings referred to in the clips 66, 67 and 70 are positioned as shown of the openings 74, 75 and 76, respectively, in certain of the clips in Figs. 10, 11 and 12.

The openings referred to in the edge of the plate 69 adjacent the clips 66 are shown at 77 being equidistantly spaced from the girder 44 and disposed in a series extending lengthwise of this girder. The openings in the edge of the plate 69 adjacent the clips 67 and represented at 78 are disposed opposite the openings 77 and are spaced from the openings 77 a distance less than the distance between the openings 74 and 75, as for example ½" less, the spacing of the openings 78 along the girder 44 being the same as the openings 77.

The openings in the plate 72 adjacent the clips 70 are provided in parallel series extending lengthwise of the plate 72, the openings of one of the series being shown at 79 and those of the other series at 80, the openings 79 and 80 being spaced apart a distance equal to the difference between the spacing between the openings 74 and 75, and the openings 77 and 78.

When the plate 60 is in the position of adjustment shown in Figs. 3, 10 and 11 it is secured in position by the pins 73 extending through the openings 74 in the clips 66 and the registering openings 77 in the plate 69, and also through the openings 76 in the clips 70 and the registering openings 80 in the plate 72.

When the plate 60 is shifted to the left in Figs. 3, 10 and 11 the pins 73 would be inserted into the openings 75 in the clips 67 and the openings 78 in the plate 69 and into the openings 76 in the clips 70 and the openings 79 in the plate 72, the plate 60 being shown in Fig. 12 in the adjusted position just referred to, the pin 73 being shown as inserted into the openings 76 and 79 in the clip 70 and plate 72.

Each of the other plates 61, 62 and 63 is provided with clip supporting means rendering them adjustable lengthwise and crosswise of the girders and with means for holding them in their different positions of adjustment, as explained of the plate 60; the same numerals being applied to the corresponding parts, it being noted that the clips 66, 67 and 70 are reversely positioned on the plates 61 and 63, and that the plates 61 and 63 are supported by the girders 45 and 46.

When the plates occupy the positions shown in Fig. 3 the plates 60 and 62 mutually endwise abut, respectively, the plates 61 and 63, and when the plates 60 and 62 are shifted to the left in Fig. 3 and the plates 61 and 63 to the right in this figure they will be spaced apart endwise (1" in the particular example given) as illustrated of the plates 60 and 61 in Fig. 12. In such spaced position of the plates 60-63, inclusive, fillers would be positioned between the spaced ends of the plates as represented at 81 in Fig. 12, wherein the filler is shown as secured against endwise displacement by a cross pin 82 on the filler entered at its ends in recesses 83 in the opposite ends of the plates 60 and 61; the under-surfaces of these fillers having grooves therein of the same shape and size as the longitudinal grooves in the plates 60-63, inclusive, and in lineal alinement therewith to form continuations of these grooves.

The cross plates 64 and 65 are provided at their ends, intermediate their upper and lower portions, with flanges, the flanges for the plate 64 being shown at 84 and one of the flanges of plate 65 being shown at 65a, which extend into grooves 85 in the edges of the plates 60-63, inclusive, and at which flanges the plates 64 and 65 are adjustable along the plates 60-63. Means shown for holding the plates 64 and 65 in adjusted position comprise bolts 86 slidable in straps 87 on the upper portions of these plates and adapted to enter openings in the flanges of adjacent ones of the plates 60-63, inclusive, suitably spaced apart lengthwise of the plates 60-62, inclusive, the openings in the plates 60 and 61 shown in Fig. 9 to receive the bolts shown in this figure being represented at 88 and 89, respectively. Heads 90 on the inner ends of the bolts 86 and nuts 91 on their outer ends hold them in place.

In the particular construction shown, wherein provision is made for the flanging of edges of rectangular sheets of various sizes and shapes, each of the plates 60, 61, 62 and 63, is provided with die-forming grooves certain of which are parallel with each other which extend lengthwise of the plates and the others of which are parallel with each other but extend crosswise of the plates at right angles to the first-mentioned grooves, and each of the plates 64 and 65 has parallel, die-forming grooves extending at right angles to the longitudinal grooves in the plates 60-63, inclusive, for registration with the transverse grooves of the plates 60-63, inclusive.

The grooves would be of a shape, in cross section, suitable for use in the forming of the flanges, on the sheet, of the particular form desired.

The particular apparatus shown is intended for the production of sheet metal panels, a portion of one thereof being shown at 92 in Figs. 7 and 8, the surrounding marginal edges of the sheet from which the panel is formed being bent into the flanged condition as shown in these figures, viz., to provide right angled flanged portions 93 surrounding the edges of the panel with outwardly curved terminal flange portions 94, the sheet at its four corners preferably being notched preliminary to the forming operation. Accordingly the die-forming grooves of the female die assembly may be provided of the cross-sectional shape as shown, the vertical sides 95 of all of the grooves being toward the center-point of the die assembly 48 indicated at A in Figs. 13 and 14.

The following is a description, by way of example, of the grouping and spacing of the various grooves in the plates 60-65, inclusive, all of the measurements indicated being taken from the vertical sides 95 of the grooves.

The longitudinally extending grooves of the plate 60 are grouped to provide two groups 96 and 97, the group 96 comprising the two grooves 98 and the group 97 comprising the two grooves 99. The grooves of each of the groups 96 and 97 are spaced apart two inches, these two groups being spaced apart six inches and the longitudinal inner edge 100 of the plate 60 being spaced 1⅞" from the one of the longitudinal grooves 99 nearest it.

The cross grooves of the plate 60 are provided in three groups 101, 102 and 103, the group 101 comprising four grooves 104 and the groups 102 and 103 comprising the grooves 105 and 106, respectively. The grooves of each of the groups 101, 102 and 103 are spaced apart 8"; the group 101, which is at the outer end of the plate 60, is spaced 16" from the group 102, and the group 102 is spaced 16" from the group 103, the group 103 being spaced 4" from the right hand end of the plate 60 in Fig. 13.

The longitudinally extending grooves of the plate 61 are grouped to provide two groups 107 and 103, the group 107 comprising the two grooves 109, and the group 108 comprising the two grooves 110. The grooves of each of the groups 107 and 108 are spaced apart two inches and lineally alined with the grooves 98 and 99, respectively, of the plate 60, the groups 107 and 108 being spaced apart six inches and the longitudinal inner edge 111 of the plate 61 being spaced 1⅞" from the one of the longitudinal grooves 110 nearest to it.

The cross grooves of the plate 61 are provided in four groups 112, 113, 114 and 115 each comprising four grooves, the grooves of these four groups being represented at 116, 117, 118 and 119, respectively. The grooves of each of the groups 112, 113, 114 and 115 are spaced apart 2"; these several groups are spaced apart 10" and the group 112 is spaced 11¾" from the left hand end of the plate 61 in Fig. 3.

The longitudinal extending grooves of the plate 62 comprise one group composed of the grooves 120, these grooves being spaced apart 4" and the longitudinal inner edge 121 of this plate being spaced 1⅞" from the one of the longitudinal grooves 120 nearest to it.

The cross grooves of the plate 62 are provided in three groups 122, 123 and 124, the group 122 comprising four grooves 125; and the groups 123 and 124 comprising the grooves 126 and 127. The spacing between the grooves of each of the groups 122, 123 and 124 and the spacing of these groups from each other and from the right hand end of the plate 62 in Fig. 3, is exactly the same as in the case of the groups 101, 102 and 103.

The longitudinally extending grooves of the plate 63 are grouped to provide a single group composed of the three grooves 128 spaced apart and from the inner edge 129 of the plate 63 as described of the grooves 120 with which they lineally align.

The cross grooves of the plate 63 are provided in four groups 130, 131, 132 and 133, each comprising four grooves, the grooves of these four groups being represented at 134, 135, 136 and 137, respectively, the spacing between the grooves of each of the groups 130–133, inclusive, and the spacing of these groups from each other and from the left hand end of the plate 63 in Fig. 13, is exactly the same as in the case of the groups 112, 113, 114 and 115.

The die grooves in plate 64 are represented at 138, these grooves being spaced apart 8".

The die grooves in the plate 65 are represented at 139 and are spaced 2" apart.

At each of the intersections between the die-grooves in the plates 60 and 63, inclusive, is a separate turntable die-groove plug 140 rotatable into any of three selected positions and comprising a circular head 141 and a cylindrical shank 142. The plates 60 to 63, inclusive, are provided at each of the intersections of the die-grooves therein with circular recesses 143 opening into concentric openings 144 in which the heads 141 and shanks 142 of the plugs 140, respectively, are confined to rotate.

The bottom surface of each head 141 is provided with grooves arranged and shaped as illustrated and comprising a diametric groove 145 extending entirely across the head and a radial groove 146 extending from the center of the head to its periphery.

The groove 145 presents at one edge an outer vertical wall portion 147 extending throughout the length of the groove 145 and merging into a bottom curved portion 148 also extending throughout the length of the groove 145 and of one-half the width of this groove; a bottom curved portion 149 parallel with the curved wall portion 148 and at one edge merging into the curved portion 148 and extending from the periphery of the head 141 to the center of the head and merging at its other edge into a vertical wall portion 150; a shallow depending wall portion 151 midway between the sides of the groove 145 and extending from the center of the head 141 to its periphery; and a bevel portion 152 extending from the lower edge of the wall portion 151 to the underside of the head 141 from the center of the head 141 to the periphery of the head at the side thereof opposite that at which the straight portion 150 extends.

The groove 146 presents an outer vertical wall portion 153 extending from the periphery of the head 141 to the inner end of the vertical wall portion 150 of the groove 145; a bottom curved portion 154 merging into the wall portion 153 and of one-half the width of the groove 146; a shallow vertical wall portion 155 midway between the sides of the groove 146 and extending from the periphery of the head 141 to the center of the plug; and a bevel portion 156 extending from the lower edge of the wall portion 155 to the underside of the head 141 and joining, at a right angle, with the bevel portion 152 of the groove 145.

If desired to have a wider and stronger ridge separation between grooves 148 and 149, this can be achieved for example, by correspondingly offsetting the rotating center of the plug with respect to the intersection of the female grooves in the die plate, and preferably slightly enlarging the diameter of the circular head of the plug 140 and the recess 143.

The width of the grooves 145 and 146 is the same as the width of the die grooves in the female die assembly and the grooves 145 and 146 accurately aline with adjacent ones of these die grooves in the different positions of rotary adjustment of the plugs 140.

The plugs 140 located at those intersections of the die-grooves of the female die assembly with which the corners of the particular sheet to be flanged register, as for example to form the flanged edged sheet, a fragmentary sectional view of which is shown at 157 in Fig. 28, are adjusted as illustrated of the plug 140 in Fig. 29, to register the grooves 145 and 146 with the adjacent angularly disposed stationary female die grooves. When the sheet to be flanged laps, at those of its edges which extend lengthwise of the die assemblies, any of the intersections between the stationary female die grooves the plugs 140 at such intersections would be turned to the position shown of the plug in Fig. 30 in which position the grooves 145 extend lengthwise of the die assemblies across the intersections and form continuations of the adjacent longitudinal female die grooves; and when the sheet to be flanged laps, at those of its edges which extend crosswise of the die assemblies, any of the intersections between the stationary female die grooves the plugs 140 at such intersections would be turned to the position shown of the one plug in Fig. 31 in which the grooves 145 extend crosswise of the die assemblies across the intersections and form continuations of the adjacent crosswise female die grooves.

The purpose of the use of the plugs 140 as shown in Figs. 30 and 31 is to avoid the forming of dents in the edges of the sheets as might occur in case no spacing plugs are provided at the intersections. However, if desired, the plugs 140 may be omitted, in which case the corners at the intersections would be right angled, instead of recessed, as stated where the plugs are used.

The plugs 140 may be held in any of their different positions of adjustment in any suitable way. The means shown for this purpose comprise a coil spring 158 on the shank 142 of each plug 140 confined under tension between a pin 159 and a washer 160 both on the shank. The washer bears downwardly against a bar 161 located in a slot 162 in the shank 142 and presses this bar against the top of the female die plate beneath it, the shank 142 having a cross pin 163 extending into an inclined slot 164 in the bar 161, to permit the bar 161 to be lifted at one end, as by the finger grip 164, to permit it, when the plug is rotated, to become entered between the stops 166 of any of the three pairs thereof carried by the female die plate beneath it and positioned to correspond with the several positions of rotary adjustment of the plug 140.

The male assembly comprises six plates 167 to 172, inclusive, of the same size, form and dimensions as the plates 60 to 65, inclusive, respectively. The plates 168, 169 and 170, which are adjustable as in the case of the respective plates 60, 61, 62 and 63, may be connected with the girders of the frame 39 for lengthwise and crosswise adjustment thereon and provided with means securing these plates in their different positions of adjustment, corresponding with the positions of adjustment of the plates 60, 61, 62 and 63, as in the case of these last referred to plates.

The plates 171 and 172 may also be provided with the same mean adapting them for sliding adjustment lengthwise of the plates 167–170, inclusive, as described of the plates 64 and 65 and the same means be provided for holding them in adjusted position, as described above of the plates 64 and 65.

The plates 167–170, inclusive, are provided with means for positioning thereon the male die elements in any selected rectangular arrangement in registration with die grooves in the female die assembly. These means are preferably in the form of mere grooves 173 provided in the upper surfaces of the plates 167–172, inclusive, to receive male die elements provided in the form of corner die elements, one being shown at 174 in Figs. 5 and 6, and straight die elements provided of different lengths, one being shown at 175 in Fig. 4 for filling the spaces between the corner elements 174.

The grooves 173 in the male die assembly are provided in groups, with the several groups spaced apart and the grooves of the several groups spaced apart, exactly as in the case of the groups of grooves in the plates 60–65, inclusive.

As it is preferred that the face portions of the male die elements 174 and 175 and represented at 176 and 177, be in the same vertical plane as shown (Figs. 4, 5, 6 and 28) allowance for the thickness of the sheet to be formed must be made in determining the spacing of the grooves in the male die plates from their inner end edges and their inner longitudinal edges. Where the metal to be formed is less than $\frac{1}{16}''$ thick the grooves in the male die plates would be spaced from their inner end edges and their inner longitudinal edges, $\frac{1}{16}''$ farther than in the case of the opposed die grooves of the female die assembly.

From the above description it will be understood that when the plates of the female die assembly and the male die assembly are similarly adjusted the grooves of these two assemblies will be in opposed registration with the corresponding inner edges of the grooves in the male die assembly offset outwardly from the corresponding (vertical) edges of the grooves of the female die assembly a distance sufficient to compensate for the thickness of the metal of the sheet to be formed as above explained so that the male die elements may enter the female die grooves with which they register in proper position to effect the desired flanging of the edges of the sheet. As will be understood, if the upper face portions 176 of the male die elements are outwardly offset, viz., away from the center point A, relative to the lower face portions 177 a sufficient distance, the spacing of the inner edges of the grooves 173 from the inner end edges and the inner longitudinal edges of the plates in which they are provided, may be exactly as in the case of the inner vertical edges 95 of the grooves of the female die plates.

The male die elements 174 and 175 are preferably of the cross sectional shape shown in Figs. 4, 6 and 28 having lower portions 178 which extend into the grooves 173 in the male die assembly and flanges 179 and 180 at which they seat on the plates of this assembly to which they are applied, the elements 174 and 175 preferably not bottoming in the grooves 173. The upper portions of the elements 174 and 175 are preferably of the cross sectional shape as shown and enter the registering grooves in the female die assembly to form flanges on the sheet as shown at 93, 94 (Fig. 28) of the flange therein illustrated.

It is clear, however, that different shaped female grooves and correspondingly different shaped male die pieces, may be used to produce correspondingly different results.

In the use of the apparatus the operator inserts into the appropriate grooves of the six plates 167–172, inclusive, of the male die assembly, four of the male corner die elements 174 at intersections of the grooves in the plates 167–170, inclusive, and the necessary number of the straight die elements 175, to fill in the spaces between the corner die elements, to form a rectangular die arrangement of a size and shape to produce an edge-flanged panel of the desired size and shape; and rotates those of the plugs 140 which register with the corner portions of the sheet into the position relative to the sheet shown of the plug in Fig. 29, whereby each of these plugs constitute the extreme corner portions of the female die grooves to be utilized in flanging the edges of the sheet; and rotates such of the other plugs 140 as may be lapped by the longitudinal or transverse edges of the sheet, between its corners, to the position shown in Fig. 30 where the lapping edge or edges of the sheet extend lengthwise of the apparatus, and as shown in Fig. 31 where the lapping edge or edges of the sheet extend crosswise of the apparatus.

The sheet from which the panel is to be formed is then laid on the male die arrangement referred to, preferably supporting the sheet (if large) from sagging in the middle portion, and the female die assembly 48 forced down to effect the desired flanging of the sheet.

As will be understood, the apparatus as provided has capacity for producing panels of a great variety of sizes and shapes with the minimum adjustment of parts thereof.

While the male die elements must be assembled into the proper position for each shape and size of panel to be produced, the female die groove plates in any of their adjusted positions present capacity for forming a large number of different sizes and shapes of panels without any change in the assembly itself.

When the longitudinal plates 60–63, inclusive, and the longitudinal plates 167–170, inclusive, are adjusted to abut at their mutually opposing ends as shown in Figs. 13 and 14 and the cross plates 64, 65, 171 and 172 are removed, and the plates adjusted so that the plates 60 and 61 edgewise contact with the plates 62 and 63 and the plates 167 and 168 edgewise contact with the plates 169 and 170, the plates 60–63, inclusive, present a capacity for forming panels of a wide range of sizes and shapes.

From this it will be seen that this particular die assembly, even when the four long plates are brought together without any change of position of, or any addition to, the female die, and with only a change in positioning of the necessary male die pieces in the male die grooves, is capable of forming the four edges of approximately 1000 different size rectangular sheets, with only 7 longitudinal grooves and 24 transverse grooves. When spaced apart in the various ways shown (both lengthwise and transversely) this number is multiplied by four.

By spacing the longitudinal plates referred to from each other crosswise of the apparatus as shown in Figs. 13 and 14 and assembling therewith the cross plates 64, 65, 171 and 172, the capacity for producing different sizes and shapes of panels is greatly augmented, particularly as the cross plates are adjustable into registry with the several groups of the transverse female die grooves.

By shifting the longitudinal plates referred to lengthwise, as for example to space them at their ends 1" as given in the above example, either with or without using the cross plates 64, 65, 171 and 172, the female die assembly has capacity for producing a wide range of sizes and shapes of panels not otherwise produceable by the apparatus.

The feature of providing the male die assembly below the female die assembly is of advantage as the operation of assembling the die elements of the male die assembly and the disassembling thereof is a simple one and may be quickly performed.

From the description it will be seen that no clamping of the sheet is necessary before forming or drawing the edges, provided the dies on the opposing edges coact as they do in the arrangement shown at the same moment and so prevent "walking" or displacement of the sheet. Further it will be understood that the drawing action of the dies, such as shown, on the opposite edges of the sheet will tend to level or stretch the sheet flat. It is preferable to cause the die parts on all edges of the sheet to act thereon at the same moment.

It will be understood that various changes and alterations in the apparatus shown may be made and the invention embodied in other forms of structure, without departing from the spirit of my invention. Thus, as above suggested, the rotating plugs may be dispensed with and the intersections, when provided, of the female die grooves present right angle corners, where the matter of avoiding slight depressions in the edges of the formed panels at the open groove intersections spanned by them, is of no moment; the grooves in the female and male die assemblies may be grouped otherwise than as shown and, if desired, the grooves of each of these assemblies may be provided in a nested arrangement without any of the grooves intersecting, which, however, would reduce very greatly the number of shapes and sizes of panels produceable by the apparatus. Furthermore, the grooves of the male and female die assemblies may, if desired, be so arranged as to produce shapes of products other than different shapes of rectangular products, and, if desired, the flanging may be produced at any of selected edges less than all of the edges of the panels. Furthermore, if desired, the female die grooves and the male die elements may be of any other suitable cross sectional contour for the forming of flanges of any desired shape. Other changes and alterations may be made without departing from the spirit of the invention.

What I claim as new, and desire to secure by Letters Patent is:

1. Die apparatus comprising die assemblies for relative movement toward and away from each other, one of said assemblies comprising relatively adjustable plates having die-bar-positioning portions and removable die bars, the other of said assemblies comprising relatively adjustable plates having die-forming portions, said die forming portions and said bar-positioning portions being provided in a plurality of similar arrangements a portion of each of which is on each of the plates of the respective assemblies, whereby the edges of sheets of different sizes or shapes may be deformed by application of said die bars selectively to the arrangements of said positioning portions and by adjusting said plates the size and shape of the product may be further varied.

2. Die apparatus comprising male and female die assemblies for relative movement toward and away from each other, said male die assembly comprising relatively adjustable plates having die-bar positioning portions and removable die bars, said female die assembly comprising relatively adjustable plates having die-grooves, said grooves and said bar-positioning portions being provided in a plurality of similar arrangements a portion of each of which is on each of the plates of the respective assemblies, whereby the edges of sheets of different sizes or shapes may be deformed by application of said die bars selectively to the arrangements of said positioning portions and by adjusting said plates the size and shape of the product may be further varied.

3. Die apparatus comprising die assemblies for relative movement toward and away from each other, one of said assemblies comprising pairs of plates having die positioning portions and removable die bars, said pairs being adjustable toward and away from each other and the plates of each pair lineally adjustable toward and from each other, the other of said assemblies comprising pairs of plates having die-forming portions, said last-referred-to pairs of plates being adjustable toward and away from each other and the plates of each of these pairs lineally adjustable toward and from each other, said die-forming portions and said bar positioning portions being provided in a plurality of similar arrangements a portion of each of which is on each of the plates of the respective assemblies, for the purpose set forth.

4. Die apparatus comprising male and female die assemblies for relative movement toward and away from each other, said male die assembly comprising pairs of plates having die-positioning portions and removable die bars, said pairs being adjustable toward and away from each other and the plates of each pair lineally adjustable toward and from each other, said female die assembly comprising pairs of plates having die grooves, said pairs of female die plates being adjustable toward and away from each other and the plates of each of these pairs lineally adjustable toward and from each other, said grooves and said bar-positioning portions being provided in a plurality of similar arrangements a portion of each of which is on each of the plates of the respective assemblies, for the purpose set forth.

5. A female die plug for use at an intersection of die grooves in a female die member, said plug being rotatable and having a through die groove and a radial die groove disposed at an angle to said through die groove, and intersecting therewith, and means to adjust said plug about its axis into one position to register at one end of said through die groove and at said radial groove with the adjacent ones of the die grooves at said intersection and form a corner die groove, and to another position to form at its through die groove a die-groove continuation of one of the die grooves at said intersection.

6. A female die plug for use at an intersection of die grooves in a female die member, said plug being rotatable and having a through die groove and a radial die groove disposed at an angle to said through die groove, and intersecting therewith, and means to adjust said plug about its axis into one position to register at one end of said through die groove and at said radial groove with the adjacent ones of the die grooves at said intersection and form a corner die groove, and to another position to form at its through die groove a die-groove continuation of one of the die grooves at said intersection, and when adjusted to still another position to form at its through die groove a die-groove continuation of the other one of the die grooves at said intersection.

7. In combination with a female die member comprising a plate having die-grooves intersecting at a plurality of points, plugs at each of said intersections, each of said plugs being rotatable and having a through die groove and a radial die groove disposed at an angle to said through die groove and intersecting therewith, said plug grooves serving when the plugs are adjusted about their axes into one position to register at ends of said through die groove and at said radial grooves with the adjacent ones of the die grooves at said intersections and form corner die grooves and when adjusted to another position to form at their through die-grooves die groove continuations of certain of the die grooves at said intersections.

8. In combination with a female die member comprising a plate having die-grooves intersecting at a plurality of points, plugs at each of said intersections, each of said plugs being rotatable and having a through die groove and a radial die groove disposed at an angle to said through die groove and intersecting therewith, said plug grooves serving when the plugs are adjusted about their axes into one position to register at ends of said through die groove and at said radial grooves with the adjacent ones of the die grooves at said intersections and form corner die grooves and when adjusted to another position to form at their through die grooves die groove continuations of certain of the die grooves at said intersections, and when adjusted to still another position to form at their through die grooves die groove continuations of the others of the die grooves at said intersections.

9. Die apparatus comprising cooperating male and female die members supported for relative movement toward and away from each other for effecting a pressing operation, the arrangement of said die members being such that only one of said cooperating die members need be changed in order to vary the size or shape of the pressed product resulting from the pressing operation, without change in the other of said cooperating die members, said female die member having grooves intersecting at a number of points, plugs being provided at each of said intersections, each of said plugs being rotatable and having a through die groove and a radial die groove disposed at an angle to said through die groove and intersecting therewith, said plugs serving when adjusted about their axes into one position to register at ends of said through die grooves and at said radial grooves with the adjacent ones of the first-named grooves at said intersections and form corner die grooves, and when adjusted to one or more other positions to form at their through die grooves die groove continuations of certain of the first-named grooves at said intersections.

10. Die apparatus comprising cooperating die members supported for relative movement toward and away from each other for effecting a pressing operation, one of said members formed with a plurality of fixed die-forming portions each intersecting a plurality of others thereof, the spacing of certain of said portion in one direction differing from others thereof in the same direction, certain of said die-forming portions cooperable with a plurality of others thereof to provide a variety of differing die arrangements, and die elements shiftable to a plurality of locations, corresponding with said die-forming portions, on the remaining die member and cooperating in each location with one of said die arrangements, whereby by change of adjustment of said die elements only, a variety of sizes and shapes of articles may be produced.

11. Die plate means formed with spaced longitudinal and transverse intersecting grooves, said transverse grooves comprising spaced groups; the groups adjacent one end of the plate spaced differently than the groups adjacent the other end of the plate, and the individual grooves of the respective groups adjacent the two ends spaced differently; and means to cooperate with any chosen pair of individual transverse grooves and with longitudinal grooves intersecting the same to die-press a large variety of lengths of material.

12. A female die plate formed with intersecting longitudinal and transverse die grooves, said transverse grooves arranged in groups, the grooves of groups at one portion of the plate spaced apart a multiple of two units of distance and the groups in said portion spaced apart a greater multiple of two, the transverse grooves of the groups in another portion of the plate spaced apart two units of distance and the groups in the last named portion spaced apart a multiple of two units and less than the spacing of the groups in the first named portion, any transverse groove cooperable with any other transverse groove and with longitudinal grooves intersectiond each to provide a plurality of die arrangements.

13. The combination of claim 12 with the longitudinal grooves in portions of the plate arranged in groups and differently spaced in the groups in different portions of the plate, any chosen pair of longitudinal and transverse grooves cooperable with any other pair of longitudinal and transverse grooves to provide a polygonal die arrangement.

14. The combination of claim 11 with means to vary the distance between the groups of one spacing of individual grooves and the groups of a different spacing of individual grooves.

HARVEY B. LINDSAY.

CERTIFICATE OF CORRECTION.

Patent No. 2,276,052. March 10, 1942.

HARVEY B. LINDSAY.

It is hereby certified that error appears in the printed specification of the above numbered patent requiring correction as follows: Page 1, first column, line 4, for the word "edges" read --edged--; line 40, for "describes" read --described--; page 3, second column, line 18, for "which" read --and--; page 4, first column, line 20, for "longitudinal" read --longitudinally--; page 5, first column, line 27, after "plates" and before "168" insert --167,--; and that the said Letters Patent should be read with this correction therein that the same may conform to the record of the case in the Patent Office.

Signed and sealed this 5th day of May, A. D. 1942.

(Seal)

Henry Van Arsdale,
Acting Commissioner of Patents.